June 23, 1959   J. W. DAWSON   2,892,156
CRYSTAL DIODES
Original Filed June 29, 1954
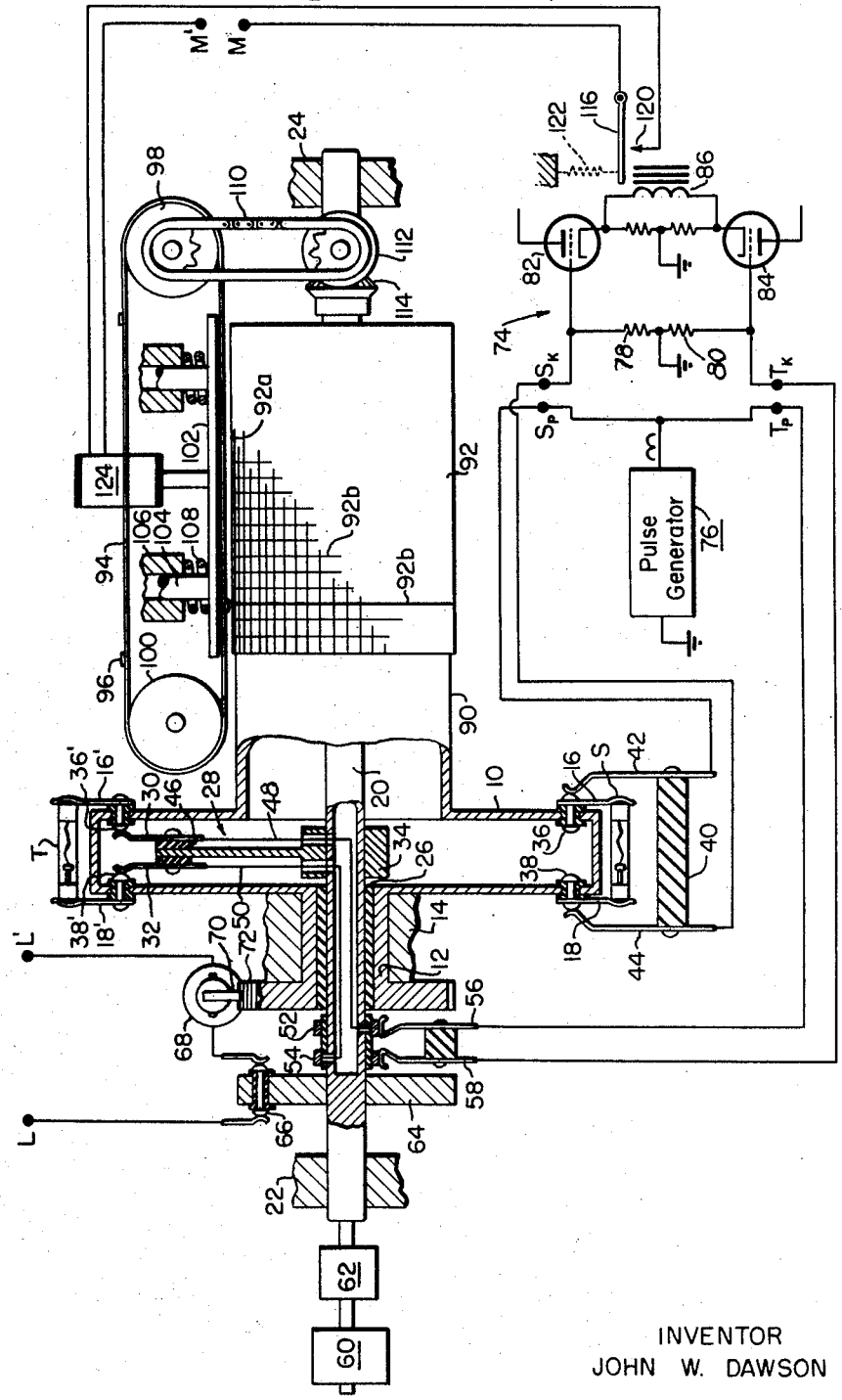
INVENTOR
JOHN W. DAWSON
BY
Elmer J. Nealon
ATTORNEY United States Patent Office 2,892,156
Patented June 23, 1959

2,892,156

CRYSTAL DIODES

John W. Dawson, Winchester, Mass., assignor to Sylvania Electric Products, Inc., Salem, Mass., a corporation of Massachusetts Continuation of application Serial No. 440,168, June 29, 1954. This application December 19, 1955, Serial No. 553,900

7 Claims. (Cl. 324—158)

The present invention relates to testing and comparing systems, and particularly to a method and apparatus for electrically comparing groups of diodes, especially point-contact crystal rectifiers, with reference to a particular characteristic or property. This application is a continuation of my copending application, Serial No. 440,168, filed June 29, 1954, now abandoned.

With the extensive application of germanium crystal diodes for video detection and allied circuit designs, it has become exceptionally important to measure the various properties or characteristics of germanium diodes, such as dynamic efficiency as a video detector, current values at specified voltages, back and forward I-E characteristics, diode capacitance, and the like. For example, production checking of static crystal characteristics may be accomplished by successively inserting diodes to be tested into a balanced amplifier bridge for comparison with a standard diode, suitable rejection-acceptance limits being set in accordance with the required production standards. The result of the individual comparison tests are listed on a chart and the diodes sorted into matched pairs for balanced detectors or sets of four for varistors. The tediousness and imperfection of this technique are manifest, especially when processing a large number of diodes.

Accordingly, it is an object of the present invention to provide a novel method and apparatus for measuring characteristics of electrical devices, especially point-contact crystal rectifiers. More particularly, it is an object of this invention to provide for the automatic sequential comparing of plural electric devices with a standard for ascertaining when a given property of the sequentially tested devices and the standard substantially coincide.

It is within the contemplation of this invention a system for taking a large number of electrical devices, such as crystal rectifiers, and to sequentially compare each of the devices against every other device as to a particular electrical characteristic, and when sufficient identity in the particular characteristic exists, to automatically record coincidence on a chart from which the devices can be sorted into groups identical with respect to the particular characteristic.

Many other objects, salutory advantages and features will occur to those skilled in the art as the detailed description proceeds. In order to render the understanding of this invention complete and lucid, and further to comply with the statutes relating to the same, and to point out precisely where a patentable advance in the arts and sciences has been made, there has been shown a specific embodiment of the invention in the accompanying drawing, wherein:

The single figure is a diagrammatic showing of a preferred embodiment of the testing device for grouping diodes identical with respect to a selected characteristic.

Referring now specifically to the drawing, there is shown a hollow turret or carrier 10, arranged to extend generally vertically and supported for intermittent indexing about a horizontal axis by an integral sleeve 12, journaled within a fixed bearing 14 of a support, not shown.

Arranged at spaced peripheral locations about the turret or carrier 10, are cooperating pairs of support and contact fingers 16, 18, 16', 18', each of a springy conductive material. The respective pairs of supporting and contact fingers support the individual point-contact crystal rectifiers, one being arbitrarily designated as a standard S and a further one, being arbitrarily designated as a crystal under test T.

Arranged coaxially of and within the sleeve 12 of the turret 10 is a shaft 20, which is journaled adjacent its opposite ends by bearings 22, 24. The shaft 20 is conductively insulated from the sleeve 12 of the turret 10 by provision of a non-conductive separator or spacer 26 intermediate the shaft 20 and the sleeve 12. Disposed within the turret 10 and fixed to the shaft 20 is a rotatable contact arm 28 including a pair of outwardly projecting spring-like contact fingers 30, 32. The moveable contact arm 28 is fixed to the shaft 20 by a head 34 and moves directly with the shaft 20. Internally and externally of the turret 10, each of the contact fingers 16, 18 terminates in contact buttons, such as the pair indicated by the reference numerals 36, 38 and 36' and 38' associated with the contact fingers 16, 18 and 16' and 18'. The contact fingers and buttons are insulated from the turret as shown in the drawing.

In order to make contact with the plate and cathode of the particular diode to be arbitrarily designated as the standard S, there is provided a fixed insulating support 40, carrying the fixed contact set 42, 44 engageable with the contact buttons 36, 38 of the adjacent contact and supporting fingers 16, 18. Similarly, provision is made for electrical connection to the spring-like contact fingers 30, 32 of the movable contact arm 28, by supporting these contact fingers on an insulating head 46 and by extending leads 48, 50 to take-off rings 52, 54 arranged externally of but electrically insulated from the shaft 20 as shown. Contiguous to and in conductive contact with the take-off rings 52, 54 are a contact set 56, 58 providing ready access to the plate and cathode respectively of the particular diode T, designated as the diode under test.

A suitable drive for the shaft 20 is provided by motor 60 coupled via a reduction box 62 to the shaft proper. As is apparent, rotation of the shaft 20 moves the movable contact arm 28 through a complete comparison cycle during which the contact fingers 30, 32 engage successive pairs of the contact buttons 36', 38' of the diodes T to be compared to the arbitrarily designated standard S.

At the end of a comparison cycle with one diode as an arbitrary standard, mechanisms are provided for indexing the turret 10 to bring the next successive diode into electrical connection with the fixed contact set 42, 44 to provide plate and cathode contact respectively with a further diode to be arbitrarily designated as a standard. For this purpose a rotating disk 64 is fixed to the shaft 20 and provided with a switching arrangement 66, adapted to close a control circuit in the position of the contact arm 28 corresponding to the end of a comparison cycle. The control circuit includes a solenoid 68 connectable to a power line L, L', the solenoid 68 being arranged via a pawl 70 and a ratchet 72 to index the turret 10 at the end of a comparison cycle. Other and varied mechanisms for co-ordinating the indexing of the turret 10 with the beginning of a new comparison cycle are apparent to those skilled in the art.

By means of this flexible arrangement there are provided two pairs of stationary contacts, one pair connected to the cathode and plate of an arbitrary standard and the other pair connected successively to the cathodes and plates of diodes for comparison with the standard. These contacts may be incorporated into any of the known circuits for ascertaining a particular diode characteristic.

For illustrative purposes a simple form of germanium diode forward-characteristic balance comparator 74 has been illustrated for comparing the successive arbitrary standards S with the remaining diodes T to be tested. The balance comparator 74 includes a pulse generator 76 which is a source of periodically varying positive pulses as from an alternating current full-wave rectifier. The output of the pulse generator is applied to terminals $Sp$ and $Tp$ which are connected to contacts 42 and 56 respectively. The terminals $Sk$ and $Tk$, connected to contacts 44 and 58 respectively, are connected to ground through a pair of identical grid resistors 78 and 80 and also to the control grids of a pair of tubes 82, 84 of identical characteristics. These tubes together with the aforementioned grid resistors constitute essential elements of a balance comparator which has its plates connected to a suitable source of plate potential and has its cathodes coupled together over cathode resistors to ground. It is apparent that any number of stages of intermediate amplification may be provided for plate or cathode coupling the tubes 82, 84 of the balance comparator to a control relay coil 86, the operation of which is hereinafter explained.

In the operation of the apparatus, two situations can exist, namely substantial coincidence between the successive arbitrary standards S and the diodes T under test, resulting in no current in the relay coil connected across the common cathode circuit of the balance comparator, or a marked difference in the characteristics of the diodes being compared resulting in current flow in the relay coil connected across the common cathode circuit of the balance comparator. An interim condition existing when a test diode has been removed from the circuit and the next test diode has not made contact results in an unbalanced condition, and another interim condition existing when both the test diode and the standard are being changed results in a balanced condition of no current flow in the relay coil.

For the purposes of recording, a cylindrical drum 90 is fixed about the shaft 20 coaxially of the turret 10. Suitable means are provided on the turret 90 to secure a recording medium 92 thereon, the medium being provided with a column 92a and a row 92b for each of the diodes supported on the turret 10. Arranged longitudinally of the recording medium 92 and above the recording drum or cylinder 90 is a continuous belt conveyor 94 carrying spaced printing members 96, the belt conveyor being supported on the rollers 98, 100. Arranged within the belt conveyor 94 for the printing members 96, is a stamping pad 102 backing up the lowermost run of the belt conveyor, the stamp pad 102 being supported by guide rods 104 received within fixed guide sleeves 106. Circomposed about the respective guide rods 104 are coil springs 108 normally biasing the stamping pad 102 downwardly and causing the printing member 96 to print along the column and row of the recording medium immediately therebeneath. The belt conveyor 94 of the printing mechanism is coordinated to the movable contact arm 28 through its movement through successive comparison cycles by means of a sprocket and chain drive 110 coupled via bevel gears 112, 114 to the shaft 20. By appropriately spacing the printing members 96, it is possible to have one printing member move along a column 92a, corresponding to the particular diode arbitrarily designated as the standard S throughout a given comparison cycle. Since the printing member is coordinated with the movement of the contact arm, it will successively be in positions opposite rows 92b corresponding to the diode T being instantaneously compared with the standard S. At the end of the given comparison cycle, a new column is brought into the printing position beneath the lower run of the printing belt, the next successive printing member being in position for movement along this column. Therefore, in order to derive actual markings or indications on the recording medium 92 for the purposes of sorting the respective diodes, it is necessary to electrically operate the stamping pad or member 102 when substantial coincidence exists between the devices under test and the arbitrarily designated standard. For this purpose, there is provided a relay arm 116 connected to a suitable source of positive potential M and arranged for operation under control of the relay coil 86. The relay arm 116 is biased out of contact with a circuit-closing terminal 120 by a spring 122, the terminal 120 completing the circuit from terminal M to terminal M' through solenoid 124 upon flow of current in relay coil 86. Solenoid 124 is arranged to maintain the stamping pad member 102 in its inoperative position against the oppositely-directed force exerted by the springs 108 as long as terminal 120 and relay arm 116 are in contact. Since only the balanced condition results in de-energization of the relay coil 86, opening of the circuit for the solenoid 124, and release of the stamping member 102, the latter will normally be maintained in its retracted or inoperative position by solenoid 124, thereby making no indications or record on the chart 92. It will of course be obvious to those skilled in the art that by reversal of the operation of the solenoid 124 and associated actuating springs 108, and the operation of the switch comprising switch arm 116 and contact 120, a control signal can be transmitted from the comparison circuit to the solenoid 124 upon coincidence of characteristics of a standard and a test device. In this way an impression would be made on the recording medium by the magnetic influence of the control signal rather than by the mechanical force of a spring arrangement.

A typical comparison cycle during successive matching and testing of the diodes on the turret 10, each with every other diode, is substantially as follows:

The motor 60 is energized to cause the shaft 20 to rotate through a comparison cycle during which successive ones of the diodes T are electrically connected in the comparison circuit 74 via the contact set 56, 58, the arbitrarily designated standard being likewise connected into the comparison circuit 74 by the contact set 42, 44. If, for example, the fifth diode tested has a substantially similar characteristic with reference to the standard, the printing member 96, which at that moment will be opposite the fifth row of the recording medium 92 and along the column corresponding to the particular diode arbitrarily designated as the standard, will be urged downwardly since the solenoid circuit 124, will be opened by deenergization of the relay coil 86. Therefore a mark will be recorded on the medium 92 indicating that the fifth diode corresponds to the standard with respect to the characteristic under consideration. The operation continues, and if during the cycle further diodes compare favorably with the standard appropriate indications will be recorded. At the end of the comparison cycle, the switch arrangement 66 coordinated to the shaft 20 will complete the circuit for the indexing solenoid 68. Thereupon the pawl and ratchet 70, 72 will index the turret 10 through an arc corresponding to the annular displacement of the respective support and contact fingers 16, 18 to bring the next diode into connection with the contact set 42, 44 to arbitrarily serve as the standard. During this indexing step no standard or test diodes will be connected in the comparator circuit, possibly for sufficient time so that a mark will be recorded on the medium 92. However, from the position of such a mark it will be obvious that it can be neglected in the analysis of the information on the chart. The cyclic operation will continue with each successive diode serving as standard and being compared to every other diode on the turret. It is to be noted that duplicate indications and recordings will be obtained when comparing the diodes, that is to say, if the first diode compares to the fifth diode when the first is designated as the standard, then when the fifth is designated as the standard another indication will be obtained that the fifth diode is similar to the first diode. By this duplication, it is possible to derive a check on the accuracy of the test system without the necessity of repeating the test or by the provision of complex mechanisms.

From the foregoing, it can be seen that the present invention provides a method for grouping diodes identical with respect to a given characteristic which essentially comprises the steps of selecting one of the diodes as the standard and then matching the standard with each of the remaining diodes for the purposes of obtaining indications when the given characteristic of the respective ones of the remaining diodes substantially coincide with the standard. These indications are recorded and suitably earmarked on a recording medium from which the matched pairs or groups of four can be sorted for use in a wide variety of circuits.

An extension of the invention suggested from the matching of diodes one against the other within a group, would be matching the group of diodes against one or more external standards, each of the group being sequentially compared with the standards for the purposes of obtaining indications of coincidence in the characteristic under consideration.

What I claim is:

1. A testing apparatus for matching groups of electrical devices having a substantially similar characteristic comprising a carrier adapted to support a plurality of electrical devices, first contact means adapted to be conductively connected to one of said electrical devices arbitrarily designated as a standard, second contact means adapted to be successively connected to further ones of said electrical devices to be tested, a measuring circuit conductively connected to said first and second contact means and arranged to compare the characteristic of said standard and the devices being tested, means responsive to said comparison circuit for recording coincidence in the characteristic of said standard and the device being tested, and means for connecting to said first contact means a further one of said electrical devices to be designated as a standard in place of said one device.

2. A testing apparatus for matching groups of rectifying devices having a substantially similar characteristic comprising a movable carrier including respective pairs of conductive fingers each adapted to engage the terminals of a rectifying device, fixed test contacts adapted to be conductively connected to a selected one of said devices arbitrarily designated as a standard, movable comparison contacts adapted to be successively connected to further ones of said devices, a measuring circuit including an input from said test and comparison contacts and arranged to provide an output when substantial coincidence exists between the characteristic of said standard and successive devices paired therewith, means responsive to the output of said comparison circuit for recording coincidence in the characteristic of said standard and the paired device and carrier moving means for disconnecting said selected one device from the fixed test contacts and for conductively connecting a further one of said devices to the fixed test contacts.

3. A testing apparatus for matching groups of electrical devices having a substantially similar characteristic comprising a rotatable carrier adapted to support a plurality of electrical devices, first contacts adapted to be conductively connected to a first one of said electrical devices during a comparison cycle, second contacts movable relative to said carrier and adapted to be successively connected to further ones of said electrical devices during the said comparison cycle, a measuring circuit electrically connected to the respective contacts and arranged to compare by pairs the characteristic of said first one of said devices and successive ones of said devices, means responsive to said comparison circuit for recording coincidence in the characteristic of successive pairs under test, means for moving said second contacts through a comparison cycle, and carrier rotating means for disconnecting said first one of said devices from said first contacts and for conductively connecting a second one of said devices to said first contacts.

4. A testing apparatus for matching groups of rectifying devices of a similar current-voltage characteristic comprising an intermittently movable turret including peripherally-spaced pairs of conductive supports each adapted to engage the terminals of a rectifying device, fixed test contacts adapted to be conductively connected to a selected one of said rectifying devices during a comparison cycle, movable comparison contacts rotatable during said comparison cycle to be successively connected to further ones of said rectifying devices, a balanced measuring circuit including an input from said test and comparison contacts and an output arranged to provide a control voltage when substantial coincidence exists between the characteristic of said one rectifying device and a paired further one of said rectifying devices, means responsive to the output of said comparison circuits for recording coincidence in the characteristic of said successive paired devices, means for rotating said comparison contacts through a comparison cycle, and means operable in dependence upon said last named means for advancing said movable turret at the end of a comparison cycle to bring a further one of said rectifying devices into engagement with said fixed contacts.

5. A testing device for grouping diodes having a similar characteristic comprising an intermittently indexable turret, a plurality of peripherally spaced pairs of support and contact fingers on said turret each adapted to engage the terminals of a diode, a fixed contact set engaging one of said pairs supporting a diode selected as a standard, a movable contact set adapted to engage successive ones of said pairs of fingers supporting diodes to be compared to said standard, a recording cylinder arranged concentrically of said turret and operatively connected thereto, said cylinder being arranged to support a recording medium having a column and row for each diode on said turret, a marking member movable longitudinally of said cylinder in timed relation with said movable contact set and along a path coinciding with and spaced from a column corresponding to the standard, a comparison circuit including an input from said fixed and movable contact sets and arranged to provide a distinctive control in response to coincidence in the characteristic of said standard and the diode under test, and means operable by said distinctive control for urging said marking member into a recording position relative to said cylinder whereby said marking member provides an indication on said recording medium in the column corresponding to said standard and in the row corresponding to the matched diode.

6. A testing device for grouping diodes having a similar characteristic comprising an intermittently indexable turret including supports each adapted to engage the terminals of a diode, a fixed contact set adapted to conductively engage one of said diodes selected as a standard, a movable contact set adapted to conductively engage successive ones of said diodes to be compared to said standard, a recording cylinder arranged concentrically of said turret and operatively connected thereto, said cylinder being arranged to support a recording medium having a column and row for each diode on said turret, printing means movable along successive columns of said recording medium in timed relation with said movable contact set, a comparison circuit including an input from said fixed and movable contact sets and arranged to provide a distinctive control in response to coincidence in the characteristic of said standard and the diode under test, and means operable in dependence upon said distinctive control for moving said printing means into a recording position relative to said cylinder.

7. A testing device for grouping diodes having a similar characteristic comprising an intermittently indexable turret adapted to support a plurality of diodes, operating means for indexing said turret at the end of a comparison cycle, a fixed contact set adapted to engage individual diodes selected as standards during successive comparison cycles, a movable contact set adapted to engage the remaining diodes during a given comparison cycle to be compared to the one diode selected as a standard, a recording cylinder arranged concentrically of said turret and operatively connected thereto, said cylinder being arranged to support a recording medium having a column and row for each diode on said turret, a printing member adapted to be moved longitudinally of said cylinder in timed relation with said movable contact set and along a path coinciding with and spaced from a column corresponding to the one diode selected as a standard, operating means for moving said movable contact set and timed printing member through a comparison cycle whereby said printing member is successively arranged along rows of said recording medium corresponding to the diodes under test, a comparison circuit including an input from said fixed and movable contact sets and arranged to provide a distinctive control in response to a coincidence in the characteristic of said standard and the diode under test, and means operable by said distinctive control for displacing said printing member into a recording position relative to said cylinder.

References Cited in the file of this patent
UNITED STATES PATENTS

| | | |
|---|---|---|
| 2,419,484 | Danziger | Apr. 22, 1947 |
| 2,567,741 | Smith | Sept. 11, 1951 |
| 2,611,811 | Yates | Sept. 23, 1952 |
| 2,748,347 | Flahertz | May 29, 1956 |